UNITED STATES PATENT OFFICE.

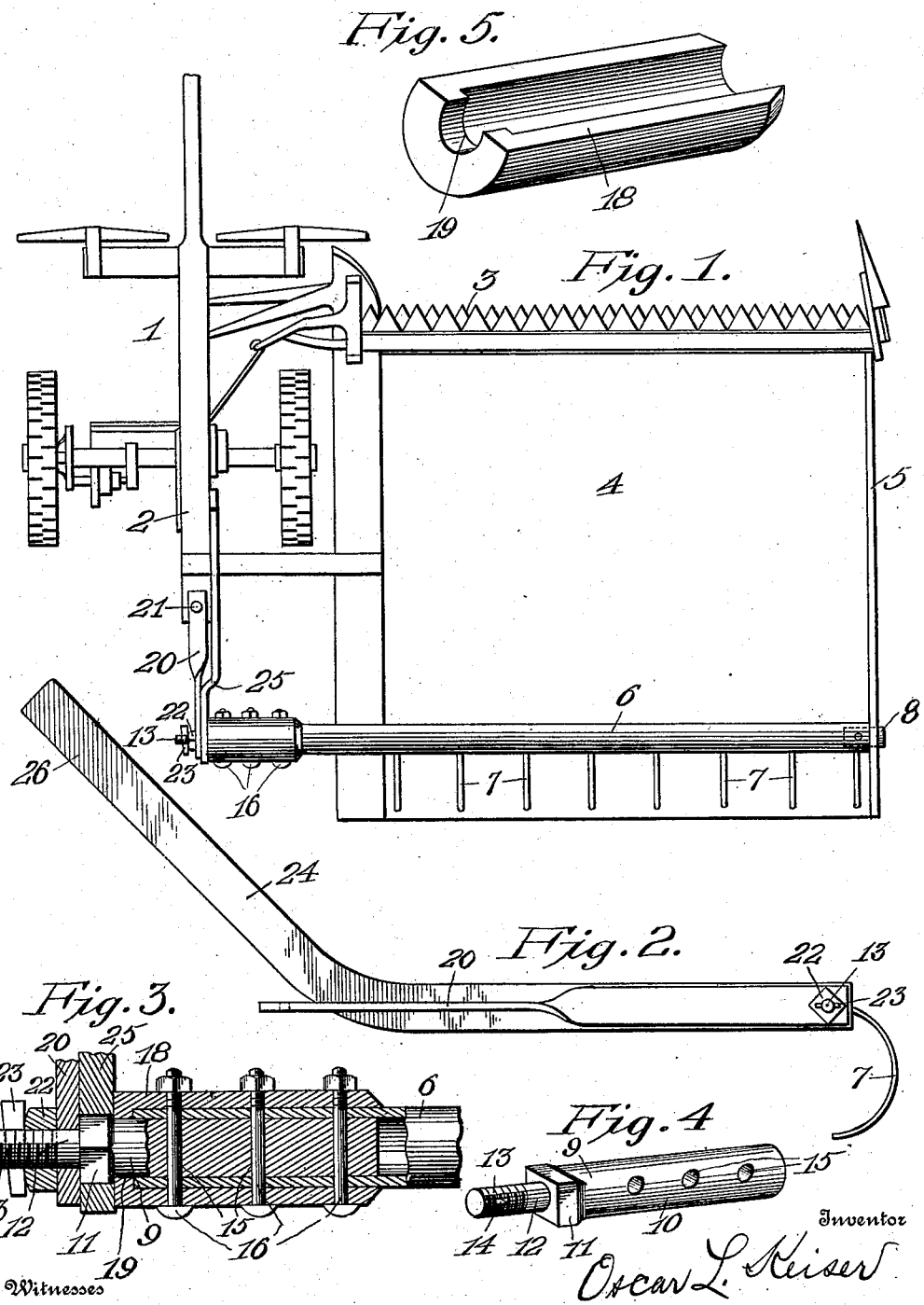

OSCAR L. KEISER, OF CENTERPOINT, INDIANA.

TRIP DEVICE FOR CLOVER-SEED BUNCHERS.

No. 915,773.        Specification of Letters Patent.        Patented March 23, 1909.

Application filed October 22, 1908. Serial No. 459,022.

*To all whom it may concern:*

Be it known that I, OSCAR L. KEISER, a citizen of the United States, residing at Centerpoint, in the county of Clay and State of Indiana, have invented certain new and useful Improvements in Trip Devices for Clover-Seed Bunchers, of which the following is a specification, reference being had to the accompanying drawings.

This invention is an improved tripping device for clover bunching machines and consists of the novel features of construction hereinafter fully described and claimed.

The object of the invention is to provide a simple and practical tripping device of this character which will be inexpensive in construction, strong and durable in use and effective in operation.

In the drawings Figure 1 is a plan view of a mowing machine showing the application of the invention thereto; Fig. 2 is a detail end elevation of the tooth bar or shaft, its operating lever and bearing bracket; Fig. 3 is a horizontal section through the parts shown in Fig. 2; Fig. 4 is a detail perspective of the pivot for one end of the tooth bar; and Fig. 5 is a detail perspective of one of the semi-cylindrical reinforcing members.

In the drawings 1 denotes a mowing machine of ordinary construction, 2 its draft tongue, 3 the usual cutter bar, 4 a platform arranged in rear of the latter and 5 the outer side bar or member of the platform.

6 denotes the tooth bar or rod of a clover buncher, said rod being in the form of a tubular bar or pipe section disposed transversely over the rear portion of the platform and carrying suitable teeth 7. In the outer end of the rod 6 is secured a cylindrical plug, the outer end of which forms a reduced cylindrical bearing 8 which is rotatable in the side 5 of the platform. The other or inner end of the rod 6 has secured in it a plug 9 which forms a pivot for said end of the rod. Said plug 9 has a large cylindrical portion 10 to enter the inner end of the rod 6, an enlarged rectangular portion 11 at one end of the portion 10 and a reduced cylindrical portion 12 which projects from the squared portion 11 and has its outer extremity screw threaded, as shown at 13, and formed with a transverse slot 14. The portion 10 of the plug is formed with a series of transverse openings 15 which receive bolts 16. The latter also pass through registering openings in the rod 6 and in two cast reinforcing members 18. The latter, as more clearly shown in Fig. 5, are semi-cylindrical in shape to fit the exterior of the rod 6 and have at their ends inwardly projecting semi-circular flanges 19 which fit over the inner end of the rod 6 and engage the portion 10 of the plug 9 adjacent to its squared portion 11. This construction, which is clearly shown in Fig. 3, serves to effectively connect the pivot plug 9 and the rod 6 and to strengthen the inner end of the latter and provide a substantial pivot for the same. Said connection can be produced at a comparatively small cost and it enables a pipe section to be used as the tooth rod or bar 6. The portion 12 of the plug 9 serves as the pivot proper and is rotatably arranged in a bearing opening in the rear end of a bracket 20 secured to the tongue 2, as shown at 21, said bracket being in the form of a metal strap twisted intermediate its ends, as clearly shown in Figs. 1 and 2. Said pivot 12 is retained in the bracket 20 by a nut 22 arranged upon the threaded portion 13 of said pivot and said nut is locked by a wedge-shaped key 23 passed through the slot or opening 14 in said pivot. The squared portion 11 of the plug 9 is adapted to enter a similar-shaped opening in an operating lever 24 in the form of a metal strap offset laterally, as shown at 25, at a point adjacent to the pivot and having its free end bent angularly to provide a forwardly and upwardly inclined extremity 26.

In operation, assuming the parts to be in their normal position shown in Figs. 1 and 2, when it is desired to elevate the teeth 7 to permit the accumulated clover, grain, or the like upon the platform 4 to be discharged from the same, the end 26 of the lever is depressed so that the tooth rod 6 rotates in a direction to lift said teeth 7.

Having thus described the invention what is claimed is:

The combination with a mowing machine having a platform and a side member formed with a bearing opening, of a tubular tooth bar or rod, a pivot at the outer end of the latter rotatable in the bearing opening in the side member, a plug formed with a cylindrical portion to enter the inner end of said rod, a squared intermediate portion and a reduced cylindrical portion having its extremity screw threaded and formed with a transverse opening, semi-cylindrical reinforcing members arranged upon the inner end of the tooth rod, transverse fastenings passed through said reinforcing members, said rod and said plug, an operating lever having a square opening to receive the squared portion of said plug, a bearing bracket upon the machine and having a bearing opening to receive the reduced cylindrical end of said plug, a nut upon the threaded portion of said reduced end of the plug, and a transverse key arranged in the opening in the same to lock the nut thereon.

In testimony whereof I hereunto affix my signature in the presence of two witnesses.

OSCAR L. KEISER.

Witnesses:
B. A. REUTSCHLER,
R. B. MUSTARD.